(12) United States Patent
Courtland et al.

(10) Patent No.: US 11,886,813 B2
(45) Date of Patent: Jan. 30, 2024

(54) EFFICIENT AUTOMATIC PUNCTUATION WITH ROBUST INFERENCE

(71) Applicant: Capital One Services, LLC, McLean, VA (US)

(72) Inventors: Maury Courtland, McLean, VA (US); Adam Faulkner, McLean, VA (US); Gayle McElvain, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 158 days.

(21) Appl. No.: 17/030,827

(22) Filed: Sep. 24, 2020

(65) Prior Publication Data
US 2021/0319176 A1    Oct. 14, 2021

Related U.S. Application Data

(60) Provisional application No. 63/009,391, filed on Apr. 13, 2020.

(51) Int. Cl.
*G06F 40/253* (2020.01)
*G06F 40/30* (2020.01)
(Continued)

(52) U.S. Cl.
CPC ......... *G06F 40/253* (2020.01); *G06F 40/284* (2020.01); *G06F 40/30* (2020.01); *G10L 15/02* (2013.01); *G10L 15/22* (2013.01)

(58) Field of Classification Search
CPC ...... G06F 40/253; G06F 40/30; G06F 40/232; G06N 3/0454; G06N 3/084; G10L 15/02; G06V 10/82; G06V 10/40
See application file for complete search history.

(56) References Cited

U.S. PATENT DOCUMENTS 10,388,272 B1 *  8/2019  Thomson ............... G10L 15/22
10,529,320 B2    1/2020  Shafran et al.
(Continued)

FOREIGN PATENT DOCUMENTS

CN    107767870 A  *  3/2018  .......... G06F 40/284
CN    107767870 A      3/2018
(Continued)

OTHER PUBLICATIONS

Ballesteros and Wanner, "A Neural Network Architecture for Multilingual Punctuation Generation," in Proceedings of the 2016 Conference on Empirical Methods in Natural Language Processing, Austin, Texas, 2016, pp. 1048-1053, doi: 10.18653/v1/D16-1111.
(Continued)

*Primary Examiner* — Richemond Dorvil
*Assistant Examiner* — Nadira Sultana
(74) *Attorney, Agent, or Firm* — Sterne, Kessler, Goldstein & Fox P.L.L.C.

(57) ABSTRACT

A system and method of operating a system for automatically punctuating text using non-recurrent neural networks is disclosed. The system and method at least: applying a text string to a first component of a non-recurrent neural network trained to generate one or more contextualized vectors, wherein the first component determines the contextualized vectors by processing each word in the text string in parallel with one another; applying the contextualized vectors to a second component of the non-recurrent neural network trained to generate a set of probability values for each word in the text string, wherein the second component determines the set of probability values by processing the contextualized vectors in parallel with one another; and transmitting the set of probability values to a text generation engine to generate a formatted text string based on the set of probability values.

18 Claims, 6 Drawing Sheets

(51) Int. Cl.
  *G06F 40/284*  (2020.01)
  *G10L 15/22*  (2006.01)
  *G10L 15/02*  (2006.01)

(56) References Cited

U.S. PATENT DOCUMENTS

| | | | | |
|---|---|---|---|---|
| 2019/0043486 A1* | 2/2019 | Salloum | ............... | G06F 40/284 |
| 2019/0156819 A1* | 5/2019 | Shafran | ................... | G10L 15/02 |
| 2020/0320433 A1* | 10/2020 | Wu | ......................... | G06F 40/30 |
| 2020/0364576 A1* | 11/2020 | Kim | ....................... | G06V 10/82 |
| 2021/0149993 A1* | 5/2021 | Torres | .................... | G06N 3/045 |
| 2021/0365632 A1* | 11/2021 | Trim | ...................... | G06N 20/00 |

FOREIGN PATENT DOCUMENTS

| | | | | |
|---|---|---|---|---|
| CN | 108932226 A | * | 12/2018 | .......... G06F 40/284 |
| CN | 108932226 A | | 12/2018 | |
| WO | WO-2017006104 A1 | * | 1/2017 | ............... G06N 3/04 |

OTHER PUBLICATIONS

Bohac et al., "Text Punctuation: An Inter-annotator Agreement Study". In Kamil Ek˘stein and V'aclav Matou˘sek, editors, Text, Speech, and Dialogue, vol. 10415, pp. 120-128. 2017. Springer International Publishing, Cham. Series Title: Lecture Notes in Computer Science.

Cai and Wang, "Question Mark Prediction By Bert," in 2019 Asia-Pacific Signal and Information Processing Association Annual Summit and Conference (APSIPA ASC), Lanzhou, China, 2019, pp. 363-367, doi: 10.1109/APSIPAASC47483.2019.9023090.

Edwards et al., "Medical Speech Recognition: Reaching Parity with Humans". In Speech and Computer, 2017, pp. 512-524, Cham. Springer International Publishing.

Garg and Anika, "Analysis of Punctuation Prediction Models for Automated Transcript Generation in MOOC Videos," in 2018 IEEE 6th International Conference on MOOCs, Innovation and Technology in Education (MITE), 2018, pp. 19-26, doi: 10.1109/MITE.2018.8747063.

Juin et al., "Punctuation prediction using a bidirectional recurrent neural network with part-of-speech tagging," in TENCON 2017-2017 IEEE Region 10 Conference, Penang, 2017, pp. 1806-1811, doi: 10.1109/TENCON.2017.8228151.

Kim, "Deep Recurrent Neural Networks with Layer-Wise Multihead Attentions for Punctuation Restoration," in ICASSP 2019-2019 IEEE International Conference on Acoustics, Speech and Signal Processing (ICASSP), Brighton, United Kingdom, 2019, pp. 7280-7284, doi: 10.1109/ICASSP.2019.8682418.

Klejch et al., "Sequence-to-sequence models for punctuated transcription combining lexical and acoustic features". 2017. In 2017 IEEE International Conference on Acoustics, Speech and Signal Processing (ICASSP), pp. 5700-5704, New Orleans, LA. IEEE.

Klejch et al., "Punctuated transcription of multi-genre broadcasts using acoustic and lexical approaches," in 2016 IEEE Spoken Language Technology Workshop (SLT), San Diego, CA, 2016, pp. 433-440, doi: 10.1109/SLT.2016.7846300.

Moró and Szaszák, "A Phonological Phrase Sequence Modelling Approach for Resource Efficient and Robust Real-Time Punctuation Recovery," in Interspeech 2017, 2017, pp. 558-562, doi: 10.21437/Interspeech.2017-204.

Moró and Szaszák, "A prosody inspired RNN approach for punctuation of machine produced speech transcripts to improve human readability," in 2017 8th IEEE International Conference on Cognitive Infocommunications (CogInfoCom), Debrecen, 2017, pp. 000219-000224, doi: 10.1109/CogInfoCom.2017.8268246.

Nanchen and Garner, "Empirical Evaluation and Combination of Punctuation Prediction Models Applied to Broadcast News," in ICASSP 2019-2019 IEEE International Conference on Acoustics, Speech and Signal Processing (ICASSP), Brighton, United Kingdom, 2019, pp. 7275-7279, doi: 10.1109/ICASSP.2019.8683796.

Öktem et al., "Attentional Parallel RNNs for Generating Punctuation in Transcribed Speech," in Statistical Language and Speech Processing, vol. 10583, N. Camelin, Y. Estève, and C. Martín-Vide, Eds. Cham: Springer International Publishing, 2017, pp. 131-142.

Salloum et al., "Deep Learning for Punctuation Restoration in Medical Reports," in BioNLP 2017, Vancouver, Canada, 2017, pp. 159-164, doi: 10.18653/v1/W17-2319.

Szaszák and Tündik, "Leveraging a Character, Word and Prosody Triplet for an ASR Error Robust and Agglutination Friendly Punctuation Approach," in Interspeech 2019, 2019, pp. 2988-2992, doi: 10.21437/Interspeech.2019-2132.

Treviso and Aluísio, "Sentence Segmentation and Disfluency Detection in Narrative Transcripts from Neuropsychological Tests," in Computational Processing of the Portuguese Language, vol. 11122, A. Villavicencio, V. Moreira, A. Abad, H. Caseli, P. Gamallo, C. Ramisch, H. Gonçalo Oliveira, and G. H. Paetzold, Eds. Cham: Springer International Publishing, 2018, pp. 409-418.

Tündik and Szaszák, "Joint Word- and Character-level Embedding CNN-RNN Models for Punctuation Restoration," in 2018 9th IEEE International Conference on Cognitive Infocommunications (CogInfoCom), Budapest, Hungary, 2018, pp. 000135-000140, doi: 10.1109/CogInfoCom.2018.8639876.

Tündik et al., "A bilingual comparison of MaxEnt- and RNN-based Punctuation Restoration in Speech Transcripts," in 2017 8th IEEE International Conference on Cognitive Infocommunications (CogInfoCom), Debrecen, 2017, pp. 000121-000126, doi: 10.1109/CogInfoCom.2017.8268227.

Tündik et al., "Low Latency MaxEnt- and RNN-Based Word Sequence Models for Punctuation Restoration of Closed Caption Data," in Statistical Language and Speech Processing, vol. 10583, N. Camelin, Y. Estève, and C. Martín-Vide, Eds. Cham: Springer International Publishing, 2017, pp. 155-166.

Tündik et al., User-centric Evaluation of Automatic Punctuation in ASR Closed Captioning. 2018. In Interspeech 2018, pp. 2628-2632. ISCA.

Vāravs and Salimbajevs, "Restoring Punctuation and Capitalization Using Transformer Models," in Statistical Language and Speech Processing, vol. 11171, T. Dutoit, C. Martín-Vide, and G. Pironkov, Eds. Cham: Springer International Publishing, 2018, pp. 91-102.

Yi et al., "Distilling Knowledge from an Ensemble of Models for Punctuation Prediction," in Interspeech 2017 ,2017, pp. 2779-2783, doi: 10.21437/Interspeech.2017-1079.

Alumäe et al., "Advanced Rich Transcription System for Estonian Speech," in Human Language Technologies—The Baltic Perspective, Jan. 2019, vol. 307, Tallinn University of Technology, Estonia, doi: 10.3233/978-1-61499-912-6-1.

Che et al., "Punctuation Prediction for Unsegmented Transcript Based on Word Vector," in Proceedings of the Tenth International Conference on Language Resources and Evaluation (LREC'16), May 2016, European Language Resources Association (ELRA), Portorož, Slovenia.

Chen et al., "Controllable Time Delay Transformer for Real-Time Punctuation Prediction and Disfluency Detection," 2020 IEEE International Conference on Acoustics, Speech and Signal Processing (ICASSP), Mar. 2020, Barcelona, Spain, doi: 10.1109/ICASSP40776.2020.9053159.

Devlin et al., "BERT: Pre-training of Deep Bidirectional Transformers for Language Understanding," in Proceedings of the 2019 Conference of the North American Chapter of the Association for Computational Linguistics: Human Language Technologies, Jun. 2019, vol. 1, Association for Computational Linguistics, Minneapolis, Minnesota, doi: 10.18653/v1/N19-1423.

Di Gangi et al., "Robust Neural Machine Translation for Clean and Noisy Speech Transcripts," Oct. 2019, Fondazione Bruno Kessler, University of Trento, Italy, doi: 10.48550/arXiv.1910.10238.

Federico et al., "Overview of the IWSLT 2012 Evaluation Campaign," in Proceedings of the 9th International Workshop on Spoken Language Translation: Evaluation Campaign, Dec. 2012, Hong Kong, p. 22.

Hinton et al., "Improving neural networks by preventing co adaptation of feature detectors," Jul. 2012, *CoRR*, abs/Xiv.1207.0580.

(56) References Cited

OTHER PUBLICATIONS

Ioffe & Szegedy, "Batch Normalization: Accelerating Deep Network Training by Reducing Internal Covariate Shift," Feb. 2015, *CoRR*, abs/1502.03167.

Jones et al., "Measuring the Readability of Automatic Speech-to-Text Transcripts," in Proceedings of the 8th European Conference on Speech Communication and Technology, Sep. 2003, Geneva, Switzerland, p. 5.

Kingma et al., "Adam: A Method for Stochastic Optimization", Jan. 30, 2017, arXiv preprint, arXiv:1412.6980v9 [cs.LG], pp. 1-15.

Lan et al., "ALBERT: A Lite BERT for Selfsupervised Learning of Language Representations", Feb. 9, 2020, arXiv preprint, arXiv:1909.11942v6 [cs.CL], pp. 1-17.

Lin et al., "Focal Loss for Dense Object Detection", Feb. 7, 2017, Facebook AI Research (FAIR), pp. 1-10.

Liu et al., "On the Variance of the Adaptive Learning Rate and Beyond", Apr. 17, 2020, arXiv preprint, arXiv:1908.03265v3 [cs.LG], pp. 1-14.

Liu et al., "ROBERTa: A Robustly Optimized BERT Pretraining Approach", Jul. 26, 2019, arXiv preprint, arXiv:1907.11692v1 [cs.CL], pp. 1-13.

Nguyen et al., "Fast and Accurate Capitalization and Punctuation for Automatic Speech Recognition Using Transformer and Chunk Merging," Aug. 7, 2019, 22nd conference of the oriental COCOSDA international committee for the coordination and standardisation of speech databases and assessment techniques (O-COCOSDA), IEEE, pp. 1-5.

Öktem, "Incorporating Prosody into Neural Speech Processing Pipelines: Applications on automatic speech transcription and spoken language machine translation", Feb. 25, 2019, PhD Dissertation, Universitat Pompeu Fabra, pp. 1-143.

Pahuja et al., "Joint Learning of Correlated Sequence Labelling Tasks Using Bidirectional Recurrent Neural Networks,", Jul. 18, 2017, arXiv preprint, arXiv:1703.04650v3 [cs.CL], pp. 1-5.

Raffel et al., "Exploring the Limits of Transfer Learning with a Unified Text-to-Text Transformer", Jul. 28, 2020, Journal of Machine Learning Research, vol. 21, pp. 1-67.

Liu et al., "ROBERTa—transformers 3.2.0 documentation," retrieved Sep. 23, 2020, huggingface.co, https://huggingface.co/transformers/model_doc/roberta.html.

Sanh et al., "DistilBERT, a distilled version of BERT: smaller, faster, cheaper and lighter," Mar. 1, 2020, arXiv preprint, arXiv:1910.01108v4 [cs.CL], pp. 1-5.

Szaszák, György, "An Audio-based Sequential Punctuation Model for ASR and its Effect on Human Readability," Acta Polytechnica Hungarica , vol. 16, No. 2, May 2019, doi: 10.12700/APH.16.2.2019.2.6, pp. 93-108.

Tilk and Alumäe, "Bidirectional Recurrent Neural Network with Attention Mechanism for Punctuation Restoration", Sep. 2016, Interspeech, vol. 3, pp. 3047-3051.

Tilk and Alumäe, "LSTM for Punctuation Restoration in Speech Transcripts," Sep. 2015, Sixteenth annual conference of the international speech communication association, pp. 683-687.

Vandeghinste et al., "A Comparison of Different Punctuation Prediction Approaches in a Translation Context," May 2018, Proceedings of the 21st Annual Conference of the European Association for Machine Translation: May 28-30, 2018, Universitat d'Alacant, Alacant, Spain, pp. 1-10.

Vaswani et al., "Attention Is All You Need," Dec. 6, 2017, 31st Conference on Neural Information Processing Systems (NIPS 2017), pp. 1-15.

Wang et al., "Self-Attention Based Network for Punctuation Restoration," Aug. 2018, 2018 24th International Conference on Pattern Recognition (ICPR), IEEE, pp. 2803-2808.

Xu et al., "Investigating LSTM for Punctuation Prediction," 2016, 2016 10th International Symposium on Chinese Spoken Language Processing (ISCSLP), IEEE, pp. 1-5.

Yang et al., "XLNet: Generalized Autoregressive Pretraining for Language Understanding," 2019, 33rd Conference on Neural Information Processing Systems (NeurIPS 2019), pp. 1-19.

Żelasko et al., "Punctuation Prediction Model for Conversational Speech," Sep. 2018, Interspeech 2018, pp. 2633-2637.

Zhang et al., "Lookahead Optimizer: k steps forward, 1 step back," 2019, 33rd Conference on Neural Information Processing Systems (NeurIPS 2019), pp. 1-19.

\* cited by examiner

300

Applying a text string to a first component of a non-recurrent neural network trained to generate one or more contextualized vectors representing a contextualized meaning for each word in the text string, and wherein the first component determines the contextualized vectors by processing each word in the text string in parallel with one another ~302

Applying the contextualized vectors output by the first component to a second component of the non-recurrent neural network trained to generate a set of probability values for each word in the text string, wherein the set of probability values indicates a likelihood that a punctuation mark exists for each word in the text string, and wherein the second component determines the set of probability values by processing the contextualized vectors in parallel with one another ~304

Transmitting the set of probability values to a text generation engine to generate a formatted text string based on the set of probability values, wherein the formatted text string includes the punctuation mark for each word of the text string ~306

```
┌─────────────────────────────────────────────────────────────────────────┐
│ Applying a text string to a first component of a non-recurrent neural   │
│ network trained to generate one or more contextualized vectors          │
│ representing a contextualized meaning for each word in the text string, │─ 402
│ and wherein the first component determines the contextualized vectors   │
│ by processing each word in the text string in parallel with one another │
└─────────────────────────────────────────────────────────────────────────┘
                                    ↓
┌─────────────────────────────────────────────────────────────────────────┐
│ Applying the contextualized vectors output by the first component to a  │
│ second component of the non-recurrent neural network trained to         │
│ generate a set of probability values for each word in the text string,  │
│ wherein the set of probability values indicates a likelihood that a     │─ 404
│ punctuation mark exists for each word in the text string, and wherein   │
│ the second component determines the set of probability values by        │
│ processing the contextualized vectors in parallel with one another      │
└─────────────────────────────────────────────────────────────────────────┘
                                    ↓
┌─────────────────────────────────────────────────────────────────────────┐
│ Generating, by a first linear layer of the second component, a first    │
│ set of vectors representing a compressed representation for each of     │
│ the contextualized vectors output by the first component, wherein the   │─ 406
│ first set of vectors is generated based on multiplying each of the      │
│ contextualized vectors output by the first component with a first set   │
│ of tunable parameters trained to predict the punctuation mark           │
└─────────────────────────────────────────────────────────────────────────┘
                                    ↓
┌─────────────────────────────────────────────────────────────────────────┐
│ Concatenating, after the first linear layer, the first set of vectors   │─ 408
│ into a further vector                                                   │
└─────────────────────────────────────────────────────────────────────────┘
                                    ↓
┌─────────────────────────────────────────────────────────────────────────┐
│ Performing a batch normalization and a dropout procedure on the         │─ 410
│ further vector to obtain a normalized version of the further vector     │
└─────────────────────────────────────────────────────────────────────────┘
                                    ↓
┌─────────────────────────────────────────────────────────────────────────┐
│ Receiving, at a second linear layer of the second component, the        │─ 412
│ normalized version of the further vector                                │
└─────────────────────────────────────────────────────────────────────────┘
                                    ↓
┌─────────────────────────────────────────────────────────────────────────┐
│ Generating, by the second linear layer, a second set of vectors         │
│ representing the set of probability values, wherein the second set of   │
│ vectors is generated based on multiplying the normalized version of     │─ 414
│ the further vector by a second set of tunable parameters trained to     │
│ predict the punctuation mark                                            │
└─────────────────────────────────────────────────────────────────────────┘
                                    ↓
┌─────────────────────────────────────────────────────────────────────────┐
│ Transmitting the set of probability values to a text generation engine  │
│ to generate a formatted text string based on the set of probability     │─ 416
│ values, wherein the formatted text string includes the punctuation      │
│ mark for each word of the text string                                   │
└─────────────────────────────────────────────────────────────────────────┘
```

FIG. 4

EFFICIENT AUTOMATIC PUNCTUATION WITH ROBUST INFERENCE

CROSS-REFERENCE TO RELATED APPLICATIONS

This application is related to U.S. Provisional Application No. 63/009,391, filed on Apr. 13, 2020, which is incorporated by reference herein.

TECHNICAL FIELD

Embodiments relate to systems and methods for machine learning processes, specifically non-recurrent neural networks.

BACKGROUND

Call centers receive hundreds of thousands of calls daily. These calls may be transcribed from speech recordings to text using an automatic speech recognition (ASR) system. The ASR system's output is a sequence of words that begin when the caller begins speaking and ends only once there is a significant duration of silence or the call ends. This text may therefore contain many sentences with no visible boundaries between them and no punctuation. Additionally, given the spontaneous nature of spoken language, the text frequently contains disfluencies, for example, filler words, false starts, incomplete phrases, and other hallmarks of unrehearsed speech. These disfluencies are not marked, and are interleaved with the rest of the speech. This further obscures the meaningful portions of the text. The lack of punctuation and boundaries in the ASR system's output causes difficulty for humans or computers analyzing, reading, or processing the text output, and causes problems for downstream models, which benefit from clearly delineated syntactic boundaries in the text. Thus, a need remains for a system and method for automatically punctuating output text of ASR systems to make the text better understandable to a reader or machine.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

FIG. 3 is an example method of operating the system in an embodiment of the present disclosure.

FIG. 4 is a further example method of operating the system in an embodiment of the present disclosure.

DETAILED DESCRIPTION

Figure 1:
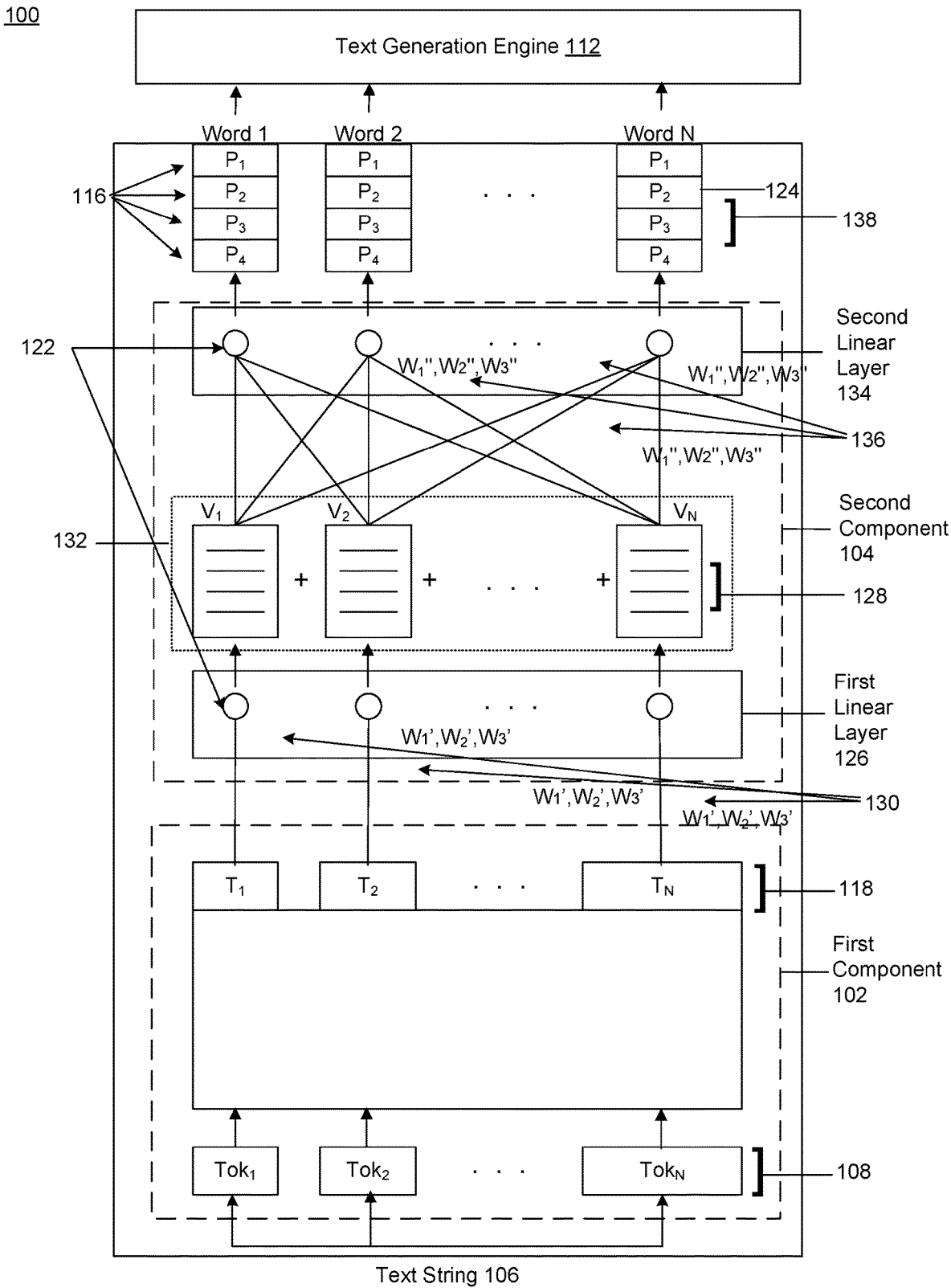
FIG. 1 is a system for automatically punctuating text using a non-recurrent neural network in an embodiment of the present disclosure.

Embodiments disclosed herein provide a way to automatically punctuate text using non-recurrent neural networks. In an embodiment, a text string is applied to a first component of a non-recurrent neural network trained to generate one or more contextualized vectors representing a contextualized meaning for each word in the text string. The first component determines the contextualized vectors by processing each word in the text string in parallel with one another. The contextualized vectors output by the first component are applied to a second component of the non-recurrent neural network. The second component is trained to generate a set of probability values for each word in the text string. The set of probability values indicates a likelihood that a punctuation mark exists for each word in the text string, and the second component determines the set of probability values by processing the contextualized vectors in parallel with one another. The set of probability values are transmitted to a text generation engine to generate a formatted text string based on the set of probability values. The formatted text string includes the punctuation mark for each word of the text string.

In a further embodiment, a text string is applied to a first component of a non-recurrent neural network trained to generate one or more contextualized vectors representing a contextualized meaning for each word in the text string. The first component determines the contextualized vectors by processing each word in the text string in parallel with one another. The contextualized vectors output by the first component are applied to a second component of the non-recurrent neural network. The second component is trained to generate a set of probability values for each word in the text string. The set of probability values indicates a likelihood that a punctuation mark exists for each word in the text string and the second component determines the set of probability values by processing the contextualized vectors in parallel with one another. A first linear layer of the second component generates a first set of vectors representing a compressed representation for each of the contextualized vectors output by the first component. The first set of vectors is generated based on multiplying each of the contextualized vectors output by the first component with a first set of tunable parameters trained to predict the punctuation mark. After the first linear layer, the first set of vectors are concatenated into a further vector. A batch normalization and a dropout procedure is performed on the further vector to obtain a normalized version of the further vector. At a second linear layer of the second component, the normalized version of the further vector is received. The second linear layer generates a second set of vectors representing the set of probability values. The second set of vectors is generated based on multiplying the normalized version of the further vector by a second set of tunable parameters trained to predict the punctuation mark. The set of probability values is transmitted to a text generation engine to generate a formatted text string based on the set of probability values. The formatted text string includes the punctuation mark for each word of the text string.

In a further embodiment one or more tunable parameters of a non-recurrent neural network are initialized. One or more text strings are applied to a first component and a second component of the non-recurrent neural network. A set of vectors is generated indicating a set of probability values for the text strings. A backpropagation process is performed on the set of probability values. The tunable parameters are adjusted based on the backpropagation process.

In this way, the punctuation mark is predicted for each word in the text string. The predicted punctuation mark may then be used to generate a formatted text string resulting in an improved transcribed text output of the ASR system.

The following embodiments are described in sufficient detail to enable those skilled in the art to make and use the disclosure. It is to be understood that other embodiments would be evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, training methods, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 shows a system 100 for automatically punctuating text using a non-recurrent neural network in an embodiment of the present disclosure. In the embodiment shown in FIG. 1, the system 100 includes two components of the non-recurrent neural network, a first component 102 and a second component 104. As shown in FIG. 1, the first component 102 and the second component 104 perform their functions such that the output of the first component 102 is the input of the second component 104. The functionality of the first component 102 and the second component 104 will be discussed further below.

As used herein, the term non-recurrent neural networks, which includes transformer networks, refers to machine learning processes and neural network architectures designed to handle ordered sequences of data for various natural language processing (NLP) tasks. The NLP tasks may include, for example, text translation, text summarization, text generation, sentence analysis and completion, determination of punctuation, or similar NLP tasks performed by computers. Further, non-recurrent neural networks do not require sequences of data to be processed in order. For example, if a sequence of data is a sequence of words of a natural language that form one or more sentences and that are to be processed by the non-recurrent neural network, the non-recurrent neural network does not need to process the words at the beginning of the sentence before it processes the words at the end of the sentence. This property allows for parallel processing of the data, resulting in faster processing times overall. Examples of non-recurrent neural networks include the Bidirectional Encoder Representations from Transformers (BERT) language model developed by Google™ and the Robustly-Optimized Bidirectional Encoder Representations from Transformers approach (RoBERTa) language model developed by Facebook™, as examples. In one embodiment, the first component 102, the second component 104, or a combination thereof may be modeled based on BERT, RoBERTa, or similar language models.

Continuing with the example, in one embodiment, assuming that the input into the system 100 is a text string 106 to be punctuated, the system 100 may begin performing its functions by applying the text string 106 to the first component 102. The purpose of the first component 102 is to obtain a representation of the meaning of each word in the context of the text string 106. The first component 102 determines the context of the text string 106 using the principles and methods that language models such as BERT and RoBERTa use to determine the meaning of each word in the context of sentences. Such principles and methods are known in the art and will only be discussed briefly throughout this application.

The text string 106 refers to a sequence of words that are unstructured (i.e., are not in sentence form and contain no punctuation marks). In one embodiment, the text string 106 may be generated based on an automatic speech recognition (ASR) system transcribing speech recordings to text. Based on the transcription and the spontaneous nature of spoken language, the text string 106 likely contains errors or is incomplete. The errors may include, for example, incorrect words, filler words, false starts to words, incomplete phrases, or a combination thereof, that make the text string 106 unreadable or difficult to understand by a human or computer.

In one embodiment, the text string 106 may be received by the first component 102 directly from the ASR system. In another embodiment, the text string 106 may be received by the first component 102 from a repository, database, or computer file that contains the text string 106. For example, in one embodiment, the text string 106 may be generated by the ASR system and saved to a repository, database, or computer file, such as a .txt file or Microsoft Word™ file, as examples, for retrieval and receipt by the first component 102.

In one embodiment, once the text string 106 is received at the first component 102, the text string 106 may be converted from text or character format into a numerical format by the system 100. In one embodiment, the conversion may be performed by converting each word of the text string 106 into one or more tokens 108. The one or more tokens 108 refer to a sequence of real values that represent and map to each word of the text string 106. In FIG. 1, the one or more tokens 108 are represented as $\{Tok_1, Tok_2, \ldots Tok_N\}$. The one or more tokens 108 allow each word of the text string 106 to be numerically quantified so that computations may be performed on them by the first component 102, with the ultimate goal being to generate one or more contextualized vectors 118. The contextualized vectors 118 refers to vectors that encode the contextualized meaning (i.e., contextualized word embeddings) of each of the tokens 108 into a vector representation. The contextualized vectors 118 are generated through the processes and methods used in language models such as the BERT and RoBERTa language models, which are known in the art. For the purposes of discussion throughout this application it is assumed that the contextualized vectors 118 are generated based on such processes and methods. In FIG. 1, the contextualized vectors 118 are represented as $\{T_1, T_2, \ldots T_N\}$.

Continuing with the example, the one or more tokens 108 may be generated based on a variety of criteria or schemes that may be used to convert characters or text to numerical values. For example, in one embodiment, each word of a text string 106 can be mapped to a vector of real values. The word may then be converted to the one or more tokens 108 based on a mapping of the word via a tokenization process. Tokenization processes are known in the art and will not be discussed in detail here.

Continuing with the example and assuming the contextualized vectors 118 are generated by the first component 102, in one embodiment, once the contextualized vectors 118 are generated, the first component 102 can transmit the contextualized vectors 118 to the second component 104 for further processing. A purpose of the second component 104 is to determine what punctuation marks should exist for each word of the text string 106. The second component 104 may perform this function by generating a set of probability values 124 indicating a likelihood that a punctuation mark 116 exists for each word of the text string 106. The set of probability values 124 refers to values that represent predictions as to which punctuation mark 116 the second component 104 predicts applies to each word of the text string 106. The punctuation mark 116 refers to punctuation marks such as a period, a comma, a question mark, or no punctuation, as examples. In FIG. 1, each of the probability values for each of the punctuation marks are represented as $\{P1, P2, P3, P4\}$, representing a period, a comma, a question mark, or no punctuation. These are merely exemplary, and the second component 104 may be trained to consider other punctuation marks. Moreover, the punctuation mark 116 is not limited to the four punctuation marks, as this is merely for ease of description and clarity. More or less punctuation marks may be considered.

Continuing with the example, in one embodiment, the second component 104 can optionally begin processing the contextualized vectors 118 by performing a compression of the contextualized vectors 118 at a first linear layer 126. This compression may be necessary due to hardware constraints so as to conserve memory and processing resources of the system 100 while it performs the computations of the second component 104. The first linear layer 126 refers to a layer of one or more neurons 122 of the non-recurrent neural network. The purpose of the first linear layer 126 is to perform a compression of the contextualized vectors 118 and to generate a set of vectors 128 representing the compressed version of the contextualized vectors 118. In FIG. 1, the set of vectors 128 are represented as $\{V_1, V_2, \ldots V_N\}$.

The compression allows the contextualized vectors 118 to be reduced in size so as to reduce their memory footprints on the system 100, the effect of which is to reduce the amount of storage it takes to store and process the values of the contextualized vectors 118 by the system 100. The compression allows the subsequent processes of the second component 104 to be performed without running the risk of the hardware performing the functions of the second component 104 running out of storage or memory capacity due to the size of the values generated by the computations of the second component 104.

The compression may be performed using any compression techniques to reduce the dimensionality of the contextualized vectors 118. For example, the contextualized vectors 118 can be multiplied each individually by a first set of tunable parameters 130 trained to predict the punctuation mark 116, as part of a matrix multiplication, to reduce the dimensionality of the contextualized vectors 118, and to obtain a smaller vector that still represents the contextualized vectors 118.

The first set of tunable parameters 130 refer to values representing aspects of the network. The first set of tunable parameters 130 can be for example, weights and biases of neurons 122 of the linear layers, attention matrices, or values representing means or variances. The first set of tunable parameters 130 can be iteratively adjusted based on a machine learned training data and back propagation process. The machine learned training data and back propagation will be described further below. In FIG. 1, the first set of tunable parameters 130 are represented as $\{W'_1, W'_2, W'_3\}$. In one embodiment, the first set of tunable parameters 130 may be real values. How the first set of tunable parameters 130 are determined will be discussed further below. For the purposes of discussion with respect to FIG. 1, it is assumed that the first set of tunable parameters 130 are already known and optimized to perform the functions of the second component 104.

In one embodiment, once the compression is performed and the set of vectors 128 is generated, the second component 104 may transmit the set of vectors 128 to a unit or module that further concatenates the set of vectors 128 to generate a further vector 132. In one embodiment, the further vector 132 is generated by combining the set of vectors 128 together into a larger vector. The further vector 132 refers to and represents the entire sequence of the text string 106 as represented by the set of vectors 128. The concatenation into the further vector 132 allows for the preservation of the interactions between the words of the text string 106 during further processing by the second component 104, thus allowing any word to directly influence the prediction of punctuation of any other word as the text string 106 is processed further by the second component 104. This feature is unique to the approach of this disclosure in that most models in the current art attempting to perform automatic punctuation of text perform predictions by successive application of a classifier predicting the punctuation marks for each word individually, which is significantly less efficient than processing a sequence of tokens in parallel. In this way, the present disclosure performs faster predictions, by taking into account the context of the text string 106 as a whole.

Continuing with the example, in one embodiment, once the further vector 132 is generated, the second component 104 may transmit the further vector 132 to a unit or module to perform a batch normalization procedure. The batch normalization procedure refers to a process where the values of the further vector 132 are standardized to the same scale. This standardization is necessary because the previous processing performed on the further vector 132 may result in numerical values representing each of the words of the text string 106 that may vary greatly from one another, and that can be on different orders of magnitude. For example, the value of one or more words in the further vector 132 may be disproportionately high in comparison to the other one or more words of the further vector 132. This will give the one or more words much higher influence on the prediction decisions given that the words interact amongst each other, and naturally higher values when doing computations, particularly the matrix multiplications performed by the second component 104, can result in higher values. This is only desirable if the high values are meaningful, which it may not be at various points during training.

By performing a batch normalization procedure, the values for each of the words may be brought down to the same scale such that continued processing of the further vector 132 is done more efficiently and so that disproportionately large or small values for each word of the text string 106 are not obtained and computed in a way that can distort the set of probability values 124. The batch normalization procedure results in a normalized version of the further vector 132.

In one embodiment, once the batch normalization procedure is performed on the further vector 132, the normalized version of the further vector 132 may be transmitted to a further unit or module to perform a dropout procedure. The dropout procedure randomly turns off a proportion of the one or more neurons 122 of the system 100 before the further vector 132 is transmitted to a second linear layer 134 of the second component 104. The turning off a proportion of the one or more neurons 122 prevents overfitting of the data by reducing reliance upon any single neuron's ability to encode information in the system 100, and forces the system 100 to learn distributed and robust representations by encoding information across multiple neurons 122. The dropout procedure thus helps to mitigate model overfitting by not enabling the system 100 to rely too heavily on a particular set of neurons 122 in the prediction of a punctuation mark 116.

In one embodiment, once the dropout procedure is performed, the normalized version of the further vector 132 is transmitted to a second linear layer 134 of the second component 104. The second linear layer 134 may be similar to the first linear layer 126, with the exception that it allows for interactions between components (the word representations) of the normalized version of the further vector 132, whereas the first linear layer 126 did not allow for such interactions across the vectors output by the first component when performing its compression. In one embodiment, the second linear layer 134 contains a second set of tunable parameters 136 trained to predict the punctuation mark 116. The second set of tunable parameters 136 may be similar to the first set of tunable parameters 130, and determined in a similar manner. In FIG. 1, the second set of tunable parameters 136 are represented as $\{W''_1, W''_2, W''_3\}$. How the second set of tunable parameters 136 are determined will be discussed further below. For the purposes of discussion with respect to FIG. 1, it is assumed that the second set of tunable parameters 136 are already known and optimized to perform the functions of the second component 104.

Continuing with the example, the purpose of the second linear layer 134 is to generate a second set of vectors 138 representing the set of probability values 124 indicating a likelihood that the punctuation mark 116 exists for each word in the text string 106. In one embodiment, the second linear layer 134 may generate the second set of vectors 138 by multiplying the normalized version of the further vector 132 by the second set of tunable parameters 136 trained to predict the punctuation mark 116.

As a result of the multiplication, the second set of vectors 138 representing the set of probability values 124 is generated indicating the likelihood that each word in the text string 106 should be followed by the punctuation mark 116.

By way of example, in one embodiment, for the text string 106 "the boy jumped over the puddle," the set of probability values 124 may be generated for each of the second set of vectors 138 indicating whether a punctuation mark 116 exists after each of the words "the", "boy", "jumped", "over", "the", and "puddle". In one embodiment, the set of probability values 124 may indicate that the probability of a period, comma, and question mark is 1 percent, for each of the words "the", "boy", "jumped", "over", and "the" while the probability of no punctuation is 97 percent. The set of probability values 124 may further indicate that the probability of a comma, question mark, and no punctuation is 1 percent for the word "puddle" while the probability of a period is 97 percent if "puddle" is the last word in the text string 106. Alternatively, if "puddle" is followed by other words, the probability of a period may be 49 percent and the probability for a comma may be 49 percent depending on the words that follow. The aforementioned is merely exemplary. The numerical values are presented to indicate a possible operation of the system 100 and are not meant to be limiting.

In one embodiment, once the second set of vectors 138 is generated, the function of the second component 104 is complete, and the second set of vectors 138, indicating the set of probability values 124, may be transmitted to a text generation engine 112 for generating a formatted text string. The probability values 124 are obtained by applying a softmax function to the second set of vectors 138. The formatted text string refers to a version of the text string 106 that contains the punctuation mark 116 for each word of the text string 106. The punctuation mark 116 is based on the set of probability values 124. In one embodiment, the text generation engine 112 may generate the formatted text string by, for example, taking the most probable punctuation mark 116 for each of the words of the text string 106 and inserting the punctuation mark 116 after each of the words of the text string 106. In this way, the formatted text string may be constructed.

In one embodiment, the formatted text string may further be transmitted for display or may be transmitted to a repository, database, or computer file, such as a .txt file or Microsoft Word™ file, as examples, to be saved for further retrieval by a user or components of the system 100.

In one embodiment, once the model is trained, in its use the aforementioned processes may be performed by successively repeating the processes for one or more text strings of a larger text string 106, where the one or more text strings contain one or more overlapping windows of text. By performing these processes on overlapping windows of text, the system 100 can more accurately determine the punctuation mark 116 for each word in a text string 106, because the overlapping windows of text allows the system 100 to determine the context for each word of the text string 106 by looking at the words before and after the word in relation to multiple combinations of words in the text string 106 such that the system 100 can better determine how the word is used in the text string 106.

The overlapping windows of text refer to the one or more tokens 108 that are grouped together for a fixed number of words. For example, the windows of text may be "N" words, where N is a positive integer. In a preferred embodiment N=100. In one embodiment, where N=100, the one or more overlapping windows of text may be a group of one hundred words such that the processes are performed for the group of one hundred words.

In one embodiment, the processes performed on the overlapping windows of text may be performed on one or more of the same words for each successive repetition of the processes, but may be incremented by a predetermined number of words for each successive repetition. In a preferred embodiment, the predetermined number of words are incremented such that the one or more text strings overlap by eighty-nine words.

By way of example, if a text string 106 "one two three four five six seven eight nine ten" is provided and N=5, the processes may be performed on a first text string "one two three four five" and a second text string "three four five six seven." As may be seen, the overlapping windows of text may have the words "three four" overlapping between the first text string and the second text string. As may further be seen, the words for each successive repetition is incremented by two words.

It has been discovered that successively repeating the processes for one or more text strings in this manner generates greater accuracy in predicting the punctuation mark 116 for each of the words of the text string 106 because it allows the system 100 to obtain greater context for each word, and allows the system 100 to view each word of the text string 106 in multiple contexts.

In one embodiment, the system 100 can process the overlapping windows of text by, for example, obtaining the output of the system 100 on the overlapping windows of text (i.e. the second set of vectors 138 from the one or more words that overlap between the overlapping windows of text) and aggregate the results for each word prior to submission to the text generation engine 112. The aggregation may be done by summing up the second set of vectors 138 across all outputs for each window of text, putting these values in a new vector, and normalizing this new vector into a normalized set of probability values 124. In a preferred embodiment, this aggregation is performed by vector addition of the second set of vectors 138 corresponding to a word across the multiple contexts of the overlapping windows of text. Once the normalized set of probability values 124 is obtained the system 100 can pick the highest probability value for each punctuation mark 116 for each word.

Figure 2A:
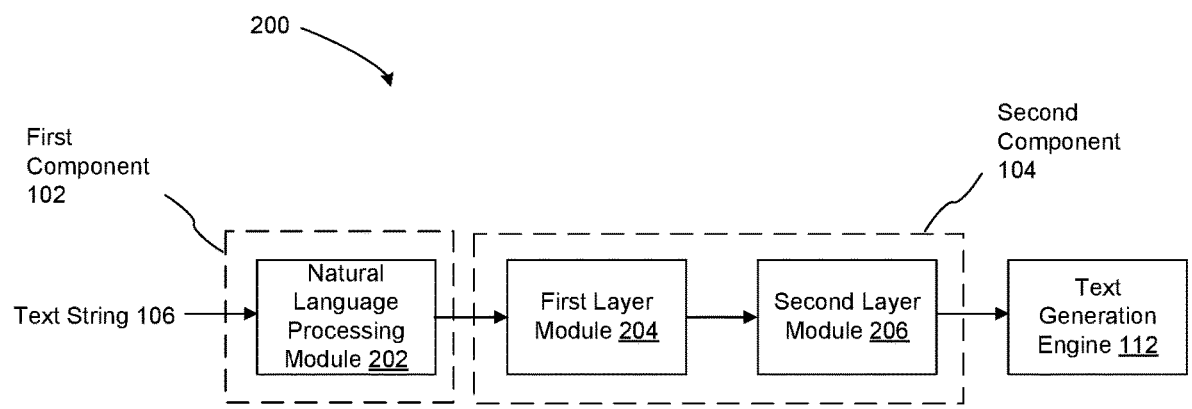
FIG. 2A is an example control flow of the system in an embodiment of the present disclosure.

FIG. 2A is an example control flow 200 of the system 100 in an embodiment of the present disclosure. In one embodiment, the control flow 200 may be implemented with modules and sub-modules. In one embodiment, the control flow 200 may include a natural language processing module 202, a first layer module 204, a second layer module 206, and the text generation engine 112. In one embodiment, the natural language processing module 202 may couple to the first layer module 204. The first layer module 204 may couple to the second layer module 206. The second layer module 206 may couple to the text generation engine 112.

In one embodiment, the natural language processing module 202 enables the functionality of the first component 102, as described with respect to FIG. 1. For example, in one embodiment, the natural language processing module 202 may contain code and execute a software to perform the functions of the first component 102. In one embodiment, the natural language processing module 202 may further receive the text string 106 as described with respect to FIG. 1. In one embodiment, once the natural language processing module 202 completes the execution of the functions of the first component 102, it may pass any variables and output generated, for example the contextualized vectors 118, to the first layer module 204.

In one embodiment, the first layer module 204 enables the functionality of the first linear layer 126 of the second component 104, as described with respect to FIG. 1. For example, in one embodiment, the first layer module 204 may contain code and execute a software to perform the functions of the first linear layer 126. In one embodiment, once the first layer module 204 completes the execution of the functions of the first linear layer 126, it may pass any variables and output generated, for example the further vector 132, to the second layer module 206.

In one embodiment, the second layer module 206 enables the functionality of the second linear layer 134 of the second component 104, as described with respect to FIG. 1. For example, in one embodiment, the second layer module 202 may contain code and execute a software to perform the functions of the second linear layer 134. In one embodiment, the second layer module 202 can further contain code and execute a software to perform the functions of the batch normalization and dropout processes described with respect to FIG. 1. In one embodiment, the batch normalization and dropout processes can be contained in other modules or sub-modules not shown in FIG. 2A, but that can contain the code and execute a software to perform the functions of the batch normalization and dropout processes. In one embodiment, once the second layer module 206 completes the execution of the functions of the second linear layer 134, it may pass any variables and output generated, for example the second set of vectors 138 representing the set of probability values 124, to the text generation engine 112. The text generation engine 112 may then generate the formatted text string as described with respect to FIG. 1.

In one embodiment, the control flow 200 may function as part of a real-time system. Real-time refers to an instance where the system 100 enables the contextualized vectors 118 and the set of probability values 124 to be generated near instantly from when the text string 106 is input into the first component 102. As a result, the transmission of the set of probability values 124 to the text generation engine 112 may be near instantaneous and the generation of the formatted text string may be done near instantly from when the text string 106 is input into the system 100. This mode of operation allows for the system 100 to be used in applications for instantaneous speech to text transcription. Alternatively, in one embodiment, the control flow 200 may function as part of a batch processing system where the speech to text operations are performed by the ASR system and the text is saved to a repository, database, or computer file for later processing and analysis by the system 100.

The modules described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the processes described above significantly improve the state of the art from previous automatic punctuation models because they allow computers to process input words of a text string 106 simultaneously, in parallel, and in a single propagation, whereas the current automatic punctuation models attempt to perform punctuation prediction in a sequential manner, where each of the words of a text string 106 are processed in sequential order. This ability to process input words and subsequent data obtained by processing the input words (such as the contextualized vectors 118) in parallel, as enabled by the use of non-recurrent neural networks in predicting punctuation as described herein, significantly speeds up processing time in predicting the punctuation.

It has been further discovered that the processes described above significantly improve the state of the art from previous automatic punctuation models because they allow for more accurate predictions about which punctuation mark 116 should exist for each word of a text string 106. Current automatic punctuation models are primarily built on Recurrent Neural Network (RNN) machine learning models. One shortcoming of the RNN based models is that because the contextualized meaning of each word analyzed must be stored and transmitted in a changing set of memory neurons, there is a possibility of contextual interactions between words being forgotten by the model, particularly between words that are farther away from each other but may nonetheless be relevant to each other in determining the punctuation mark 116 (i.e., long distance context cues). This weakening of contextual interaction between words results in less accurately predicting a punctuation mark 116, whereas the approach proposed in this disclosure allows for direct interaction of long-distance context cues that eliminates the possibility of forgetting contextual information between words.

It has been further discovered that the processes described above significantly improve the state of the art from previous automatic punctuation models because by successively repeating the processes for one or more text strings, where the one or more text strings contain one or more overlapping windows of text, the system 100 may generate more accurate results in predicting what punctuation mark 116 exists for a word in a text string 106, because it allows for each individual word in a text string 106 to be viewed several times in the various contexts of the one or more text strings and in combination with various different words. It is believed that this allows the system to more than compensate for the limited context at the left and right edges of an input string, when predicting punctuation for multiple tokens at once.

System Training

Figure 2B:
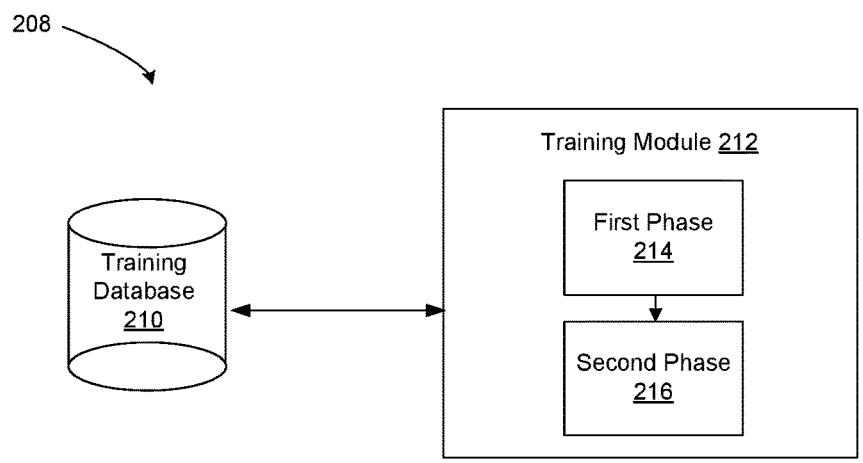
FIG. 2B is an example training procedure for training the system in an embodiment of the present disclosure.

FIG. 2B is an example training procedure 208 for training the system 100 in an embodiment of the present disclosure. The training procedure 208 enables determination of the various tunable parameters, for example the first set of tunable parameters 130 and the second set of tunable parameters 136, used in the system 100 as described with respect to FIG. 1. In one embodiment, the training procedure 208 may be performed with a training module 212 in conjunction with a training database 210. The training database 210 refers to a database which is used to train and teach the system 100 how to predict punctuation for one or more text strings. In one embodiment, the training database 210 can contain a corpus of transcripts containing words, sentences, or phrases with proper punctuation that are labeled, to be used to train the system 100.

In one embodiment, the training module 212 may enable the determination of the values of the tunable parameters of the system 100. In one embodiment, the training module 208 may be performed in two phases, a first phase 214 and a second phase 216. For the purposes of discussion with respect to the training procedure 208, it is assumed that tunable parameters also exist for the first component 102 and have been predetermined. Assuming that tunable parameters for the first component 102 exist, the first phase 214 may proceed by maintaining the tunable parameters of the first component 102 static (i.e., freezing or not allow these tunable parameters to change), and further randomly initialize a separate set of tunable parameters for the second component 104, for example the first set of tunable parameters 130 and the second set of tunable parameters 136. The random initialization refers to the assigning of random real values to the first set of tunable parameters 130 and the second set of tunable parameters 136.

In one embodiment, once the random initialization is performed, one or more text strings, obtained from the training database 210, can be applied to the system 100 as described with respect to FIG. 1. In one embodiment, the one or more text strings may be applied to the first component 102 and the second component 104 and applied one at a time until a termination condition is reached. The termination conditions will be discussed further below.

Based on the processing by the system 100, the system 100 generates a set of values, similar to the second set of vectors 138 indicating the set of probability values 124 for the one or more text strings. In one embodiment, the system 100 can save and store the set of values in a memory, database, repository, or similar storage location. Once a predetermined number of set of values are generated, the system 100 can perform a backpropagation process on the set of values to modify the randomly initialized tunable parameters initially set to an updated set of tunable parameters. The backpropagation is done based on knowing the proper punctuation for the input data due to the labels associated with data on the training database 210 which indicate the proper punctuation marks for the data. The system 100 can then compare the output of the system 100 based on the set of values with the known punctuation to determine an error between the two sets of data.

The training module 212 can then proceed to determine how to reconcile the error, by determining what adjustments to make to the values of the tunable parameters of the second component 104 so as to obtain an output by the system 100 more closely matching the known values (i.e., the correct punctuation mark 116 for each word). In one embodiment, the reconciliation can be done by performing a gradient descent process on the cross entropy loss function by which values for the tunable parameters of the second component 104 can be iteratively adjusted so as to lower the error between the set of values obtained by the system 100 and the training data (i.e., the data obtained from the training database 210), such that the predictions generated by the system 100 yield outputs and sets of values closely matching those of the known data. This process is known and referred to as the backpropagation process.

The back propagation process is performed in a supervised manner. In one embodiment, the first phase 214 can be performed until it is determined that the tunable parameters of the second component 104 have been optimized to a point where the system 100 predicts the punctuation marks at a high degree of accuracy or above a threshold value predetermined to represent the high degree of accuracy. For example, ninety-eight percent correct predictions for punctuation on the training data. In another embodiment, the first phase 214 can be performed until a predetermined amount of iterations through the data are performed. In another embodiment, the first phase 214 can be performed until the accuracy improvement for predicting the punctuation mark 116 for a text string 106 has fallen below a certain threshold of improvement. For example, if the system 100 does not improve its accuracy by more than "X" percent, where "X" is a real value, for each successive iteration of the text string 106 through the system 100, the first phase 214 can stop.

In one embodiment, once the training module 212 completes the first phase 214, the training module 212 can proceed with the second phase 216. The second phase 216 refers to a stage of the training module 212 where the training module 212 unfreezes or no longer holds the tunable parameters of the first component 102 static, and further allows the system to iteratively adjust all the tunable parameters of the first component 102 and the second component 104 together to fine tune all the tunable parameters of the system 100. The second phase 216 may proceed in the same manner as the first phase 214, except that a backpropagation process is performed on all the tunable parameters of the system 100, for example those of the first component 102 and the second component 104 allowing both to become optimized to predict more accurate results for predicting punctuation.

While the training module 212 has been described above as performing its functions in two phases, in an alternative embodiment, the training module 212 can perform its functions by implementing one phase in which all the tunable parameters of the system 100, for example the tunable parameters of the first component 102 and the second component 104 are randomly initialized. The training module 212 can then perform the functions described above of applying one or more text strings obtained from the training database 210 and apply the text strings to the system 100. The training module 212 similar to what was described can perform a backpropagation after a certain number of iterations or sets of values are generated to determine the tunable parameters of the system 100 that generate outputs that yield a high rate of accuracy as described previously.

It has been discovered, however, that having the training module 212 performed in two phases results in faster training times because the training module 212 can leverage known tunable parameters that have been previously tuned and optimized from pre-existing systems such as BERT or RoBERTa for the first component 102, and allow the system 100 to only determine from randomized initial values the tunable parameters for the second component 104.

Methods of Operation

FIG. 3 is an example method 300 of operating the system 100 in an embodiment of the present disclosure. The method 300 includes applying a text string 106 to a first component 102 of a non-recurrent neural network trained to generate one or more contextualized vectors 118 representing a contextualized meaning for each word in the text string 106, and wherein the first component 102 determines the contextualized vectors 118 by processing each word in the text string 106 in parallel with one another, as shown in 302.

The method 300 further includes applying the contextualized vectors 118 output by the first component 102 to a second component 104 of the non-recurrent neural network trained to generate a set of probability values 124 for each word in the text string 106, wherein the set of probability values 124 indicates a likelihood that a punctuation mark 116 exists for each word in the text string 106, and wherein the second component 104 determines the set of probability values 124 by processing the contextualized vectors 118 in parallel with one another, as shown in 304.

The method 300 further includes transmitting the set of probability values 124 to a text generation engine 112 to generate a formatted text string based on the set of probability values 124, wherein the formatted text string includes the punctuation mark 116 for each word of the text string 106, as shown in 306.

FIG. 4 is a further example method 400 of operating the system 100 in an embodiment of the present disclosure. The method 400 includes applying a text string 106 to a first component 102 of a non-recurrent neural network trained to generate one or more contextualized vectors 118 representing a contextualized meaning for each word in the text string 106, and wherein the first component 102 determines the contextualized vectors 118 by processing each word in the text string 106 in parallel with one another, as shown in 402.

The method 400 further includes applying the contextualized vectors 118 output by the first component 102 to a second component 104 of the non-recurrent neural network trained to generate a set of probability values 124 for each word in the text string 106, wherein the set of probability values 124 indicates a likelihood that a punctuation mark 116 exists for each word in the text string 106, and wherein the second component 104 determines the set of probability values 124 by processing the contextualized vectors 118 in parallel with one another, as shown in 404

The method 400 further includes generating, by a first linear layer 126 of the second component 104, a first set of vectors 128 representing a compressed representation for each of the contextualized vectors 118 output by the first component 102, wherein the first set of vectors 128 is generated based on multiplying each of the contextualized vectors 118 output by the first component 102 with a first set of tunable parameters 130 trained to predict the punctuation mark 116, as shown in 406.

The method 400 further includes concatenating, after the first linear layer 126, the first set of vectors 128 into a further vector 132, as shown in 408.

The method 400 further includes performing a batch normalization and a dropout procedure on the further vector 132 to obtain a normalized version of the further vector 132, as shown in 410.

The method 400 further includes receiving, at a second linear layer 134 of the second component 104, the normalized version of the further vector 132, as shown in 412.

The method 400 further includes generating, by the second linear layer 134, a second set of vectors 138 representing the set of probability values 124, wherein the second set of vectors 138 is generated based on multiplying the normalized version of the further vector 132 by a second set of tunable parameters 136 trained to predict the punctuation mark 116, as shown in 414.

The method 400 further includes transmitting the set of probability values 124 to a text generation engine 112 to generate a formatted text string based on the set of probability values 124, wherein the formatted text string includes the punctuation mark 116 for each word of the text string 106, as shown in 416.

Figure 5:
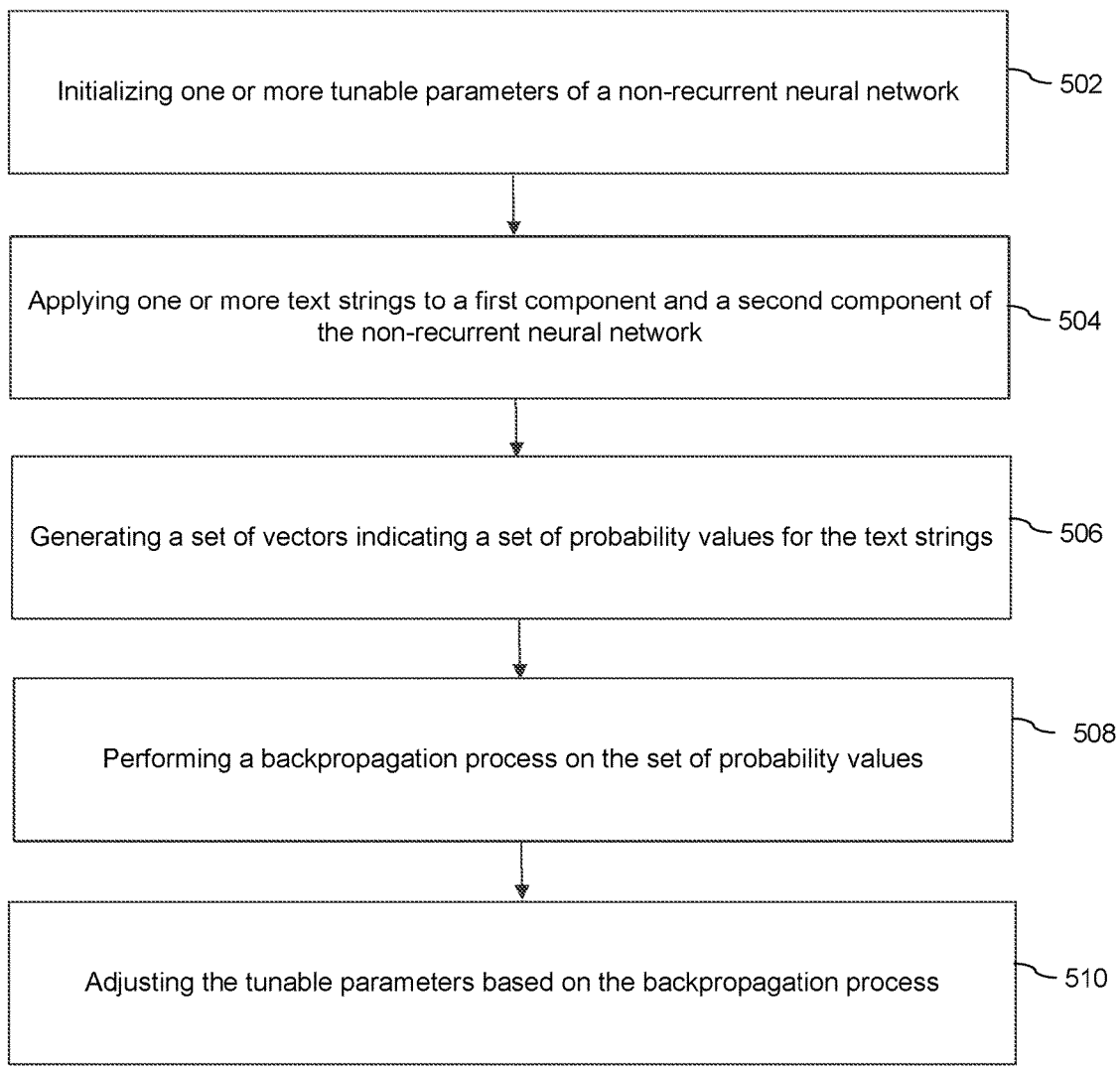
FIG. 5 is a further example method of operating the system in an embodiment of the present disclosure

FIG. 5 is a further example method 500 of operating the system 100 in an embodiment of the present disclosure. The method 500 includes initializing one or more tunable parameters 130/136 of a non-recurrent neural network, as shown in 502.

The method 500 further includes applying one or more text strings to a first component 102 and a second component 104 of the non-recurrent neural network, as shown in 504.

The method 500 further includes generating a set of vectors indicating a set of probability values 124 for the text strings, as shown in 506.

The method 500 further includes performing a backpropagation process on the set of probability values 124, as shown in 508.

The method 500 further includes adjusting the tunable parameters 130/136 based on the backpropagation process, as shown in 510.

Components of the System

Figure 6:
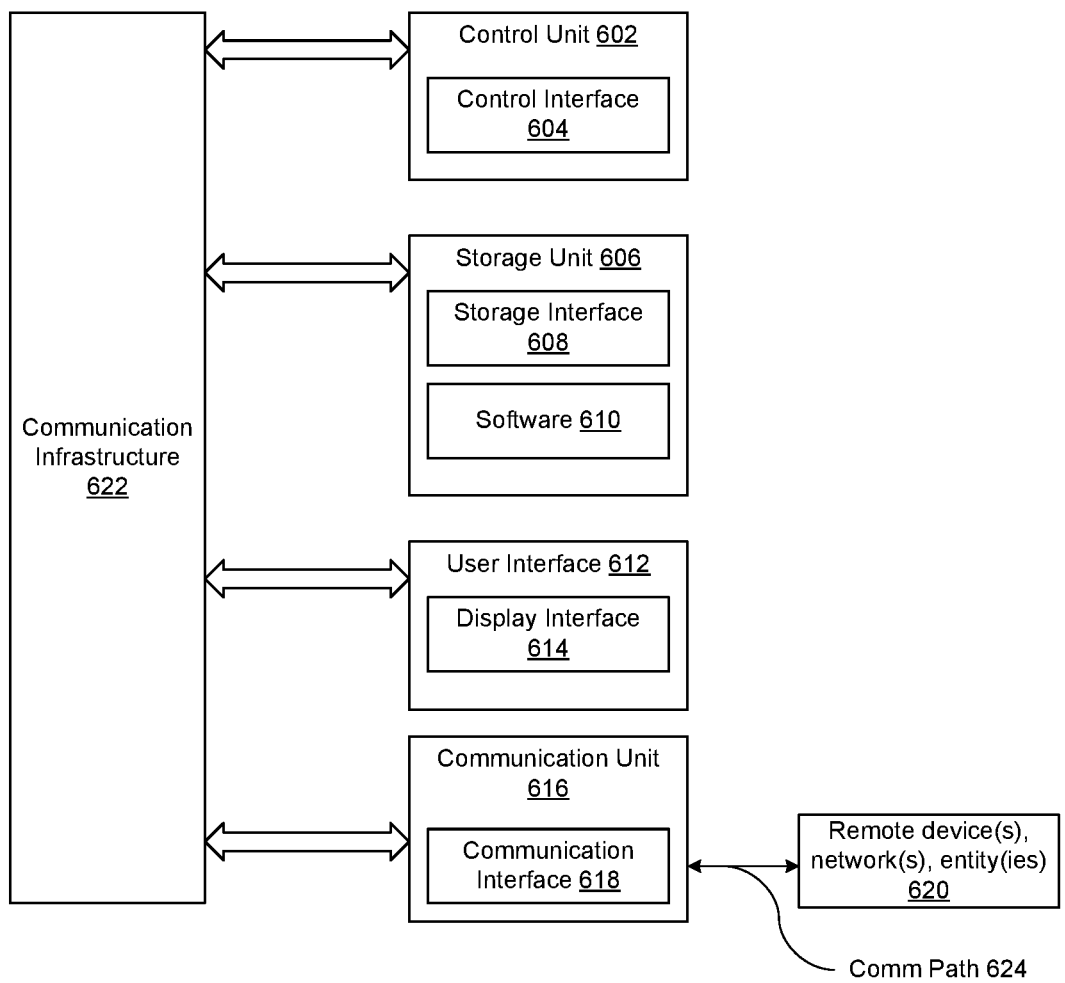
FIG. 6 is an example architecture of the components implementing the system in an embodiment of the present disclosure.

FIG. 6 is an example architecture 600 of the components implementing the system 100 in an embodiment of the present disclosure. In one embodiment, the components may include a control unit 602, a storage unit 606, a communication unit 616, and a user interface 612. The control unit 602 may include a control interface 604. The control unit 602 may execute a software 610 to provide some or all of the intelligence of the system 100. The control unit 602 may be implemented in a number of different ways. For example, the control unit 602 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 604 may be used for communication between the control unit 602 and other functional units or devices of the system 100. The control interface 604 may also be used for communication that is external to the functional units or devices of the system 100. The control interface 604 may receive information from the functional units or devices of the system 100, or from remote devices 620, or may transmit information to the functional units or devices of the system 100 or to remote devices 620. The remote devices 620 refer to units or devices external to the system 100.

The control interface 604 may be implemented in different ways and may include different implementations depending on which functional units or devices of the system 100 or remote devices 620 are being interfaced with the control unit 602. For example, the control interface 604 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 604 may be connected to a communication infrastructure 622, such as a bus, to interface with the functional units or devices of the system or remote devices 620.

The storage unit 606 may store the software 610. For illustrative purposes, the storage unit 606 is shown as a single element, although it is understood that the storage unit 606 may be a distribution of storage elements. Also for illustrative purposes, the storage unit 606 is shown as a single hierarchy storage system, although it is understood that the storage unit 606 may be in a different configuration. For example, the storage unit 606 may be formed with different storage technologies forming a memory hierarchical system including different levels of caching, main memory, rotating media, or off-line storage. The storage unit 606 may be a volatile memory, a nonvolatile memory, an internal memory, an external memory, or a combination thereof. For example, the storage unit 606 may be a nonvolatile storage such as nonvolatile random access memory (NVRAM), Flash memory, disk storage, or a volatile storage such as static random access memory (SRAM) or dynamic random access memory (DRAM).

The storage unit 606 may include a storage interface 608. The storage interface 608 may be used for communication between the storage unit 606 and other functional units or devices of the system 100. The storage interface 608 may also be used for communication that is external to the system 100. The storage interface 608 may receive information from the other functional units or devices of the system 100 or from remote devices 620, or may transmit information to the other functional units or devices of the system 100 or to remote devices 620. The storage interface 608 may include different implementations depending on which functional units or devices of the system 100 or remote devices 620 are being interfaced with the storage unit 606. The storage interface 608 may be implemented with technologies and techniques similar to the implementation of the control interface 604.

The communication unit 616 may enable communication to devices, components, modules, or units of the system 100 or to remote devices 620. For example, the communication unit 616 may permit the system 100 to communicate with the training database 210 or the ASR system. The communication unit 616 may further permit the devices of the system 100 to communicate with remote devices 620 such as an attachment, a peripheral device, or a combination thereof through a communication path 624, such as a wireless or wired network.

The communication path 624 may span and represent a variety of networks and network topologies. For example, the communication path 624 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 624. Cable, Ethernet, digital subscriber line (DSL), fiber optic lines, fiber to the home (FTTH), and plain old telephone service (POTS) are examples of wired communication that may be included in the communication path 624. Further, the communication path 624 may traverse a number of network topologies and distances. For example, the communication path 624 may include direct connection, personal area network (PAN), local area network (LAN), metropolitan area network (MAN), wide area network (WAN), or a combination thereof.

The communication unit 616 may also function as a communication hub allowing the system 100 to function as part of the communication path 624 and not be limited to be an end point or terminal unit to the communication path 624. The communication unit 616 may include active and passive components, such as microelectronics or an antenna, for interaction with the communication path 624.

The communication unit 616 may include a communication interface 618. The communication interface 618 may be used for communication between the communication unit 616 and other functional units or devices of the system 100 or to remote devices 620. The communication interface 618 may receive information from the other functional units or devices of the system 100, or from remote devices 620, or may transmit information to the other functional units or devices of the system 100 or to remote devices 620. The communication interface 618 may include different implementations depending on which functional units or devices are being interfaced with the communication unit 616. The communication interface 618 may be implemented with technologies and techniques similar to the implementation of the control interface 604.

The user interface 612 may present information generated by the system 100. In one embodiment, the user interface 612 allows a user of the system 100 to interface with the devices of the system 100 or remote devices 620. The user interface 612 may include an input device and an output device. Examples of the input device of the user interface 612 may include a keypad, buttons, switches, touchpads, soft-keys, a keyboard, a mouse, or any combination thereof to provide data and communication inputs. Examples of the output device may include a display interface 614. The control unit 602 may operate the user interface 612 to present information generated by the system 100, such as the formatted text string. The control unit 602 may also execute the software 610 to present information generated by the system 100, or to control other functional units of the system 100. The display interface 614 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and may be implemented by adapting components for ready, efficient, and economical manufacturing, application, and utilization. Another important aspect of an embodiment of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method for automatically punctuating text, the method comprising:
   (a) applying, by one or more computing devices, a text string to a first component of a non-recurrent neural network trained to generate one or more contextualized vectors representing a contextualized meaning for each word in the text string, and wherein the first component determines the contextualized vectors by processing each word in the text string in parallel with one another;
   (b) generating, by the first component, the one or more contextualized vectors;
   (c) applying, by the one or more computing devices, an output of the contextualized vectors by the first component to a second component of the non-recurrent neural network trained to generate a set of probability values for each word in the text string, wherein the set of probability values indicates a likelihood that a punctuation mark exists for each word in the text string, and wherein the second component determines the set of probability values by processing the contextualized vectors in parallel with one another;
   (d) generating, by a first linear layer of the second component, a first set of vectors representing a compressed representation for each of the contextualized vectors output by the first component, wherein the first set of vectors is generated based on multiplying each of the contextualized vectors output by the first component with a first set of tunable parameters trained to predict the punctuation mark;
   (e) concatenating, after the first linear layer, the first set of vectors into a further vector;
   (f) generating, by the second component, the set of probability values;
   (g) transmitting, by the one or more computing devices, the set of probability values to a text generation engine to generate a formatted text string based on the set of probability values, wherein the formatted text string includes the punctuation mark for each word of the text string, wherein the applying the text string to the first component, applying the contextualized vectors output, and the transmitting occur in real-time; and
   (h) generating, by the text generation engine, the formatted text string.

2. The computer-implemented method of claim 1, further comprising:
   (i) performing a batch normalization and a dropout procedure on the further vector to obtain a normalized version of the further vector;
   (j) receiving, at a second linear layer of the second component, the normalized version of the further vector; and
   (k) generating, by the second linear layer, a second set of vectors representing the set of probability values, wherein the second set of vectors is generated based on multiplying the normalized version of the further vector by a second set of tunable parameters trained to predict the punctuation mark.

3. The computer-implemented method of claim 2, further comprising successively repeating (a)-(k) for one or more text strings, wherein the one or more text strings contain one or more overlapping windows of text, and wherein the successively repeating (a)-(k) results in the second set of vectors for each successive repetition that are aggregated for each word prior to transmitting to the text generation engine.

4. The computer-implemented method of claim 3, wherein the one or more text strings include a first text string and a second text string, and wherein the second text string is incremented from the first text string by a predetermined number of words.

5. The computer-implemented method of claim 1, wherein the punctuation mark includes: a period, a comma, a question mark, or no punctuation.

6. The computer-implemented method of claim 2, wherein the first set of tunable parameters and the second set of tunable parameters are determined based on a backpropagation process.

7. A non-transitory computer readable medium having instructions stored thereon that, when executed by a computing system for automatically punctuating text, cause the computing system to perform operations comprising:
   (a) applying, by one or more computing devices, a text string to a first component of a non-recurrent neural network trained to generate one or more contextualized vectors representing a contextualized meaning for each word in the text string, and wherein the first component determines the contextualized vectors by processing each word in the text string in parallel with one another;

(b) generating, by the first component, the one or more contextualized vectors;

(c) applying, by the one or more computing devices, an output of the contextualized vectors by the first component to a second component of the non-recurrent neural network trained to generate a set of probability values for each word in the text string, wherein the set of probability values indicates a likelihood that a punctuation mark exists for each word in the text string, and wherein the second component determines the set of probability values by processing the contextualized vectors in parallel with one another;

(d) generating, by a first linear layer of the second component, a first set of vectors representing a compressed representation for each of the contextualized vectors output by the first component, wherein the first set of vectors is generated based on multiplying each of the contextualized vectors output by the first component with a first set of tunable parameters trained to predict the punctuation mark;

(e) concatenating, after the first linear layer, the first set of vectors into a further vector;

(f) generating, by the second component, the set of probability values;

(g) transmitting, by the one or more computing devices, the set of probability values to a text generation engine to generate a formatted text string based on the set of probability values, wherein the formatted text string includes the punctuation mark for each word of the text string, wherein the applying the text string to the first component, applying the contextualized vectors output, and the transmitting occur in real-time;

(h) generating, by the text generation engine, the formatted text string.

8. The non-transitory computer readable medium of claim 7, the operations further comprising:

(i) performing a batch normalization and a dropout procedure on the further vector to obtain a normalized version of the further vector;

(j) receiving, at a second linear layer of the second component, the normalized version of the further vector; and (k) generating, by the second linear layer, a second set of vectors representing the set of probability values, wherein the second set of vectors is generated based on multiplying the normalized version of the further vector by a second set of tunable parameters trained to predict the punctuation mark.

9. The non-transitory computer readable medium of claim 8, the operations further comprising successively repeating (a)-(k) for one or more text strings, wherein the one or more text strings contain one or more overlapping windows of text, and wherein the successively repeating (a)-(k) results in the second set of vectors for each successive repetition that are aggregated for each word prior to transmission to the text generation engine.

10. The non-transitory computer readable medium of claim 9, wherein the one or more text strings include a first text string and a second text string, and wherein the second text string is incremented from the first text string by a predetermined number of words.

11. The non-transitory computer readable medium of claim 8, wherein the first set of tunable parameters and the second set of tunable parameters are determined based on a backpropagation process.

12. The non-transitory computer readable medium of claim 7, wherein the punctuation mark includes: a period, a comma, a question mark, or no punctuation.

13. A computing system for automatically punctuating text comprising:

a control unit configured to:

(a) apply a text string to a first component of a non-recurrent neural network trained to generate one or more contextualized vectors representing a contextualized meaning for each word in the text string, and wherein the first component determines the contextualized vectors by processing each word in the text string in parallel with one another;

(b) generate, by the first component, the one or more contextualized vectors;

(c) apply an output of the contextualized vectors by the first component to a second component of the non-recurrent neural network trained to generate a set of probability values for each word in the text string, wherein the set of probability values indicates a likelihood that a punctuation mark exists for each word in the text string, and wherein the second component determines the set of probability values by processing the contextualized vectors in parallel with one another;

(d) generate a first set of vectors representing a compressed representation for each of the contextualized vectors output by the first component, wherein the first set of vectors is generated based on multiplying each of the contextualized vectors output by the first component with a first set of tunable parameters trained to predict the punctuation mark;

(e) concatenate the first set of vectors into a further vector;

(f) generate, by the second component, the set of probability values; and a communication unit, coupled to the control unit, configured to:

(g) transmit the set of probability values to a text generation engine to generate a formatted text string based on the set of probability values, wherein the formatted text string includes the punctuation mark for each word of the text string, wherein the applying the text string to the first component, applying the contextualized vectors output, and the transmitting occur in real-time; and (h) generate, by the text generation engine, the formatted text string.

14. The computing system of claim 13, wherein the control unit is further configured to:

(i) perform a batch normalization and a dropout procedure on the further vector to obtain a normalized version of the further vector; and (j) generate a second set of vectors representing the set of probability values, wherein the second set of vectors is generated based on multiplying the normalized version of the further vector by a second set of tunable parameters trained to predict the punctuation mark.

15. The computing system of claim 14, wherein the control unit is further configured to successively repeat (a)-(j) for one or more text strings, wherein the one or more text strings contain one or more overlapping windows of text, and wherein the successively repeating (a)-(j) results in the second set of vectors for each successive repetition which are aggregated for each word prior to transmission to the text generation engine.

16. The computing system of claim 15, wherein the one or more text strings include a first text string and a second text string, and wherein the second text string is incremented from the first text string by a predetermined number of words.

17. The computing system of claim 14, wherein the first set of tunable parameters and the second set of tunable parameters are determined based on a backpropagation process.

18. The computing system of claim 13, wherein the punctuation mark includes: a period, a comma, a question mark, or no punctuation.

* * * * *